Mar. 10, 1925.  1,529,401
E. G. BUSSE
LOCKING MEANS FOR ADJUSTABLE BRAKE HEADS
Filed July 3, 1924    2 Sheets-Sheet 2
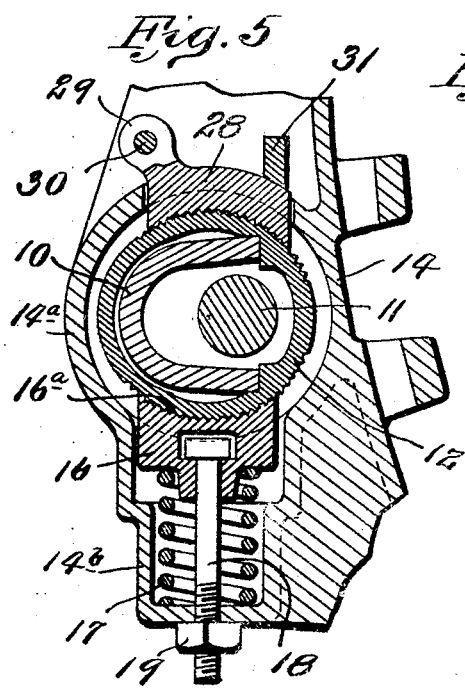
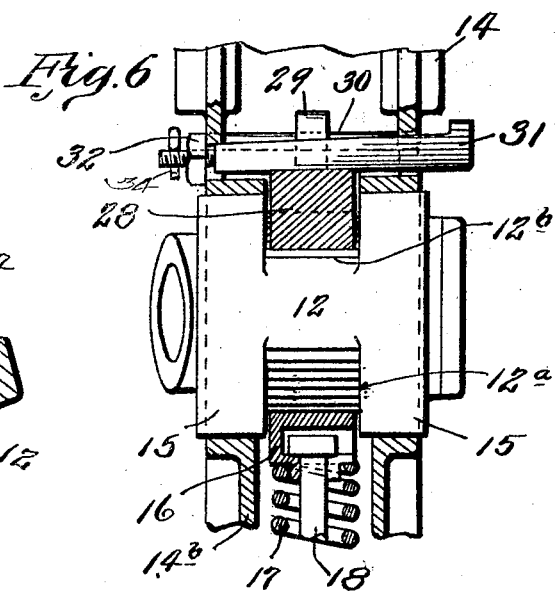
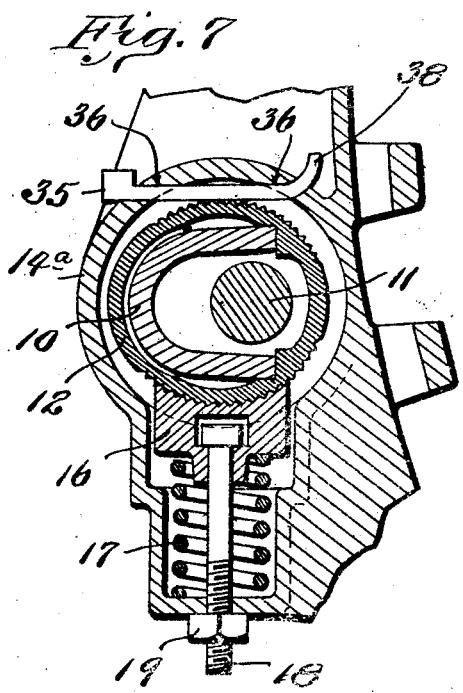
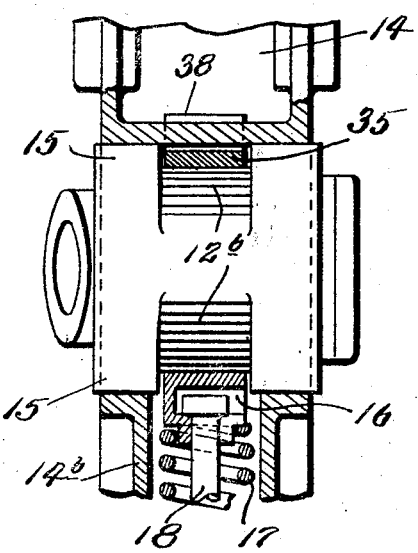
Inventor
Edwin G. Busse
By Cornwall, Bedell & James
Attys.

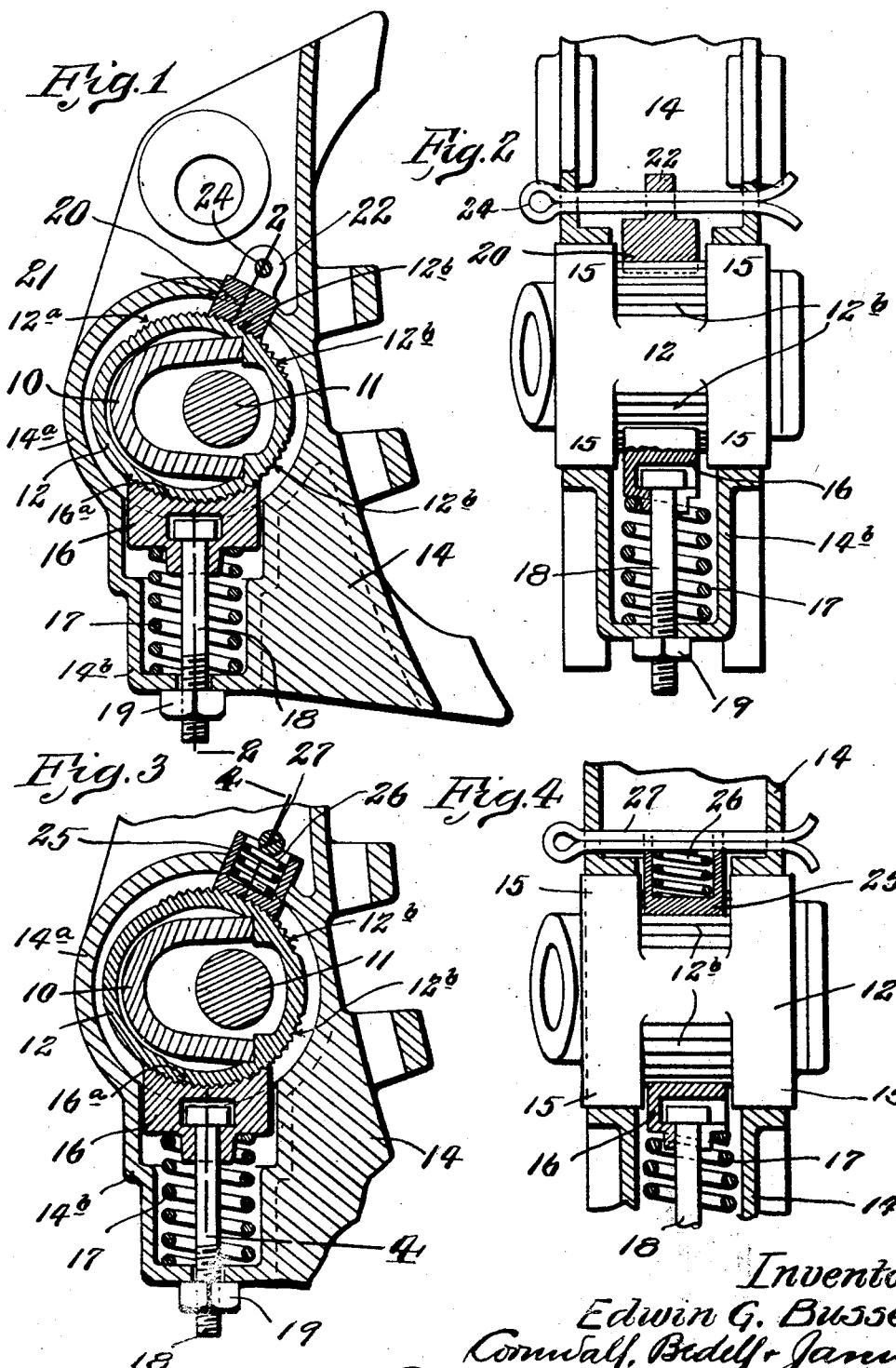
Mar. 10, 1925.
E. G. BUSSE
1,529,401
LOCKING MEANS FOR ADJUSTABLE BRAKE HEADS
Filed July 3, 1924
2 Sheets-Sheet 1
Inventor
Edwin G. Busse
By Cornwall, Bedell & Janus
Attys.

Patented Mar. 10, 1925.

1,529,401

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

LOCKING MEANS FOR ADJUSTABLE BRAKE HEADS.

Application filed July 3, 1924. Serial No. 723,917.

*To all whom it may concern:*

Be it known that I, EDWIN G. BUSSE, a citizen of the United States, residing at Chicago, Illinois, have invented a certain new and useful Improvement in Locking Means for Adjustable Brake Heads, of which the following is a specification, such as will enable others skilled in the art to which it appertains to make and use the same.

This invention relates to new and useful improvements in safety locks for automatically adjustable brake heads, and the objects of the invention are to provide a locking device which serves as a safety element and prevents the displacement of the brake head in case the gripping block or pawl or parts associated therewith become disabled.

Other objects of the invention are to provide simple and economical safety means for locking the brake head against lateral or rotary movement, or both, which safety device can be used in conjunction with the existing types of brake heads and can be readily and conveniently applied in position.

With these and other objects in view, my invention consists in certain novel features of construction and arrangement of parts, hereinafter more fully described and claimed, and illustrated in the accompanying drawings, in which—

Figure 1 is a vertical cross section taken through a brake head and one end of a brake beam and showing the safety lock attached thereto.

Figure 2 is a vertical cross section taken on line 2—2 of Figure 1.

Figure 3 is a vertical cross section through the brake head and one end of the brake beam and showing a modified form of safety lock.

Figure 4 is a cross section taken on line 4—4 of Figure 3.

Figure 5 is a vertical cross section through a brake head and one end of the beam and showing another modified form of a safety lock.

Figure 6 is a cross sectional view taken at right angles to Figure 5 with the brake beam sleeve in elevation.

Figure 7 is a cross sectional view of the brake head and one end of the brake beam and showing another modified form of the safety lock.

Figure 8 is a cross sectional view taken at right angles to Figure 7 and showing the sleeve in elevation.

The present invention is adapted particularly for use with brake heads automatically adjustable on the brake beam. In this form of the brake head, a sleeve is arranged on each end of the brake beam and the sleeve is provided with a circumferentially disposed groove, the peripheral face of which groove is serrated or formed with longitudinally disposed corrugations with which is adapted to cooperate the serrated concave face of a gripping block or pawl mounted in said brake head and held in yielding engagement with said sleeve in any suitable manner. The annular shoulders or flanges formed on said sleeve by said groove form suitable journals for the circular housing or bearing formed in each brake head. The gripping block projected into engagement with the serrated face of the groove occupies the space between the annular shoulders or flanges and thus prevents the lateral movement of the brake head relative to the brake beam.

It is the purpose of the present invention to provide a safety lock which will interengage and interlock the brake head and the sleeve independently of the usual gripping block, thereby eliminating all danger of the brake head becoming loose or displaced in case said gripping block or pawl or parts associated therewith are broken or displaced.

Referring by numerals to the accompanying drawings, 10 indicates a compression member and 11 a tension member of a trussed brake beam. 12 is a sleeve fixed on each end of the brake beam and forming journals or bearings for a brake head 14. Each sleeve 12 is provided with a circumferentially disposed groove or depressed portions 12$^a$, the peripheral faces of which are provided with longitudinally disposed serrations or corrugations 12$^b$. The annular shoulders or flanges 15 formed thereby on sleeve 12 have bearings in a circular housing 14$^a$ formed in brake head 14 and rotatably support said brake head on the beam. Brake head 12 is provided with a housing 14$^b$ in which is slidably arranged a gripping block or pawl 16 having a concave face 16$^a$ provided with suitable serrations or corrugations for engaging the corrugations of sleeve 12.

Block 16 is held in yielding engagement with sleeve 12 by a coiled spring 17 disposed in housing 14^b. A bolt 18 extends upwardly through housing 14^b and has its head seated in a suitable recess or pocket formed in block 16. The opposite or threaded end of said bolt extends outwardly from housing 14^b and receives a nut 19, by the rotation of which in the proper direction, block 16 may be retracted from its operative position to permit the insertion and removal of the brake head on the beam.

When the parts are assembled in position, the brake head is held against lateral movement by virtue of the interengagement of blocks 16 with the annular shoulders of flanges 15 and said brake head is allowed to pivot or tilt on said sleeve in order to automatically adjust the brake shoe to the wheel.

To prevent displacement of the brake head in case of the disengagement of the gripping block from the sleeve caused by breakage of the spring or from any other cause, a safety lock is provided which interlocks the brake head with the sleeve independently of the gripping pawl. This safety lock consists of a member 20 which extends inwardly through a suitable opening formed in circular housing 14^a and has its concave inner face provided with serrations for engaging the serrated face of sleeve 12. This block or member 20 has an upstanding ear or lug 22 provided with a suitable aperture for the reception of a cotter pin 24, which cotter pin is secured at its ends to the walls of the brake head. Thus the brake head is positively interlocked with the sleeve and is retained in position on the beam under all conditions.

In the modified form shown in Figures 3 and 4, a safety lock member 25 is provided with an outwardly presented pocket or recess for the reception of a coiled spring 26, the lower end of which bears against said block while its upper end bears against a cotter pin or similar attaching element 27 and thus yieldingly maintains the safety lock member 25 in engagement with the sleeve, thereby permitting the automatic adjustment of the brake head on the beam and at the same time securely locking the brake head in position on the sleeve as the cotter pin 27 prevents the removal or displacement of said safety block 25.

In the modified form shown in Figures 5 and 6 a safety lock member 28 is provided with an apertured lug or ear 29, at one end, for the reception of a cotter pin or similar fastening device 30. A wedge key 31 traverses the openings formed in the walls of the brake head and bears on the opposite end of said safety member and forces the latter in fixed engagement with the sleeve. One end of the wedge member 31 is threaded and receives a nut 32 whereby, by turning said nut, said wedge member 31 can be drawn up tightly against the safety member 28 after which nut 32 is locked on the threaded end of said wedge by a cotter pin 34.

A modified form shown in Figures 7 and 8 consists of a wedge member 35 which is driven tangentially to and in engagement with the serrated peripheral face of the sleeve through suitable openings 36 formed in the circular housing 14^a of brake head 14. When member 35 is in position its entering end is bent upwardly as indicated at 38 in order to prevent the removal of said lock member from the housing 14^a.

I claim:

1. In a brake gear construction, the combination of a beam part, a brake head adjustably arranged thereon, a gripping pawl carried by said brake head and yieldingly engaging said brake beam part for adjustably holding said brake head in position, and a safety lock member carried by said brake head and projecting therefrom into a position for engagement with said brake beam part and thereby hold said brake head against lateral movement.

2. In a brake gear construction, the combination of a brake beam part having a serrated peripheral wall and shouldered annular extensions, a brake head rotatably mounted on said brake beam part, a gripping pawl carried by said brake head and yieldingly engaging said peripheral wall, a safety locking member carried by said brake head and having a serrated concave face for engaging said peripheral wall of said brake beam part and cooperating with said annular extensions for preventing the lateral movement of said brake head.

3. The combination of a brake beam, a sleeve fixed to one end thereof and provided with a peripheral groove, a brake head journaled on said sleeve, a gripping block carried by said brake head and yieldingly engaging said sleeve for adjustably retaining said brake head in operative position, and a safety lock member carried by said brake head and disposed in said peripheral groove of said sleeve for positively locking said brake head against displacement from said sleeve.

4. The combination of a brake beam, a sleeve fixed to one end thereof and provided with a peripheral groove having a serrated face, a brake head journaled on said sleeve, a gripping pawl carried by said brake head and yieldingly engaging the serrated peripheral face of said groove for yieldingly maintaining said brake head in its adjusted operative position, and a safety lock member carried by said brake head and engaging the face of said groove for limiting the lateral movement of said brake head.

5. The combination of a brake beam, a sleeve fixed to one end thereof and provided with a peripheral groove having a serrated face, a brake head journaled on said sleeve, a gripping pawl carried by said brake head and yieldingly engaging the serrated face of said groove for maintaining said brake head in adjustable operative position, a safety lock member mounted in said brake head and having bearing in said peripheral groove, thereby holding said brake head against displacement, and a retaining member for securing said lock member in position on said brake head.

6. The combination of a brake beam, a sleeve fixed thereon and provided with a peripheral groove, the face of which is serrated, a brake head journaled on said sleeve, a gripping pawl carried by said brake head and engaging said serrated face for yieldingly retaining said brake head in adjusted position on said beam, a safety lock member mounted in said brake head and having a face portion for engaging the serrated face of said groove, thereby interlocking said brake head and said sleeve independently of said gripping pawl, and means for forcing said safety lock member into engagement with said sleeve.

7. A brake head having a journal opening, a gripping pawl carried by said brake head and extending into said journal opening for preventing the axial movement of said brake head, and locking means for locking said brake head in its operative position.

8. In a brake gear construction, a brake head having a journal opening to receive a journal part of a brake beam, a gripping pawl on said brake head and extending into said opening to engage said brake beam part and lock the brake head against lateral movement, and auxiliary locking means carried by said brake head for locking the same in operative position.

9. In a brake head construction, a brake head adapted to be rotatively mounted and held against axial displacement, and an auxiliary locking member in said brake head for positively locking the same in operative position.

10. A brake head having a journal opening and provided with a gripping pawl adapted to engage the brake head journal and hold said brake head against lateral movement, and locking means carried by said brake head and adapted to engage said journal for locking said brake head against displacement independently of said gripping pawl.

11. A brake head having a journal housing adapted to rotatively receive a brake beam part, a gripping pawl arranged in an extension of said housing for engaging said brake beam part and locking said brake head thereto, and a member seated in said housing and extending thereinto and adapted to lock said brake head to said brake beam part independently of said gripping pawl.

In testimony whereof I hereunto affix my signature this 26th day of June, 1924.

EDWIN G. BUSSE.